J. RIPLINGER,

Assignor, by mesne assignments, of part interest to J. A. KEEN and E. R. HIETT.

Stove-Lining.

No. 8,760. Reissued June 17, 1879.

WITNESSES.

James B. Lizius,

R. P. Daggett

INVENTOR.

John Riplinger,

PER

C. Bradford,

ATTORNEY.

N. PETERS, PHOTO-LITHOGRAPHER, WASHINGTON, D. C.

UNITED STATES PATENT OFFICE.

JOHN RIPLINGER, OF LA FAYETTE, INDIANA, ASSIGNOR, BY MESNE ASSIGNMENTS, OF PART INTEREST TO JOSHUA A. KEEN AND EMERY R. HIETT, OF SAME PLACE.

IMPROVEMENT IN STOVE-LININGS.

Specification forming part of Letters Patent No. 212,266, dated February 11, 1879; Reissue No. 8,760, dated June 17, 1879; application filed March 13, 1879.

*To all whom it may concern:*

Be it known that I, JOHN RIPLINGER, of the city of La Fayette, county of Tippecanoe, and State of Indiana, have invented certain new and useful Improvements in Adjustable Stove-Linings, of which the following is a specification, reference being had to the accompanying drawings, which are made a part hereof, and on which similar letters of reference indicate similar parts.

Figure 1:
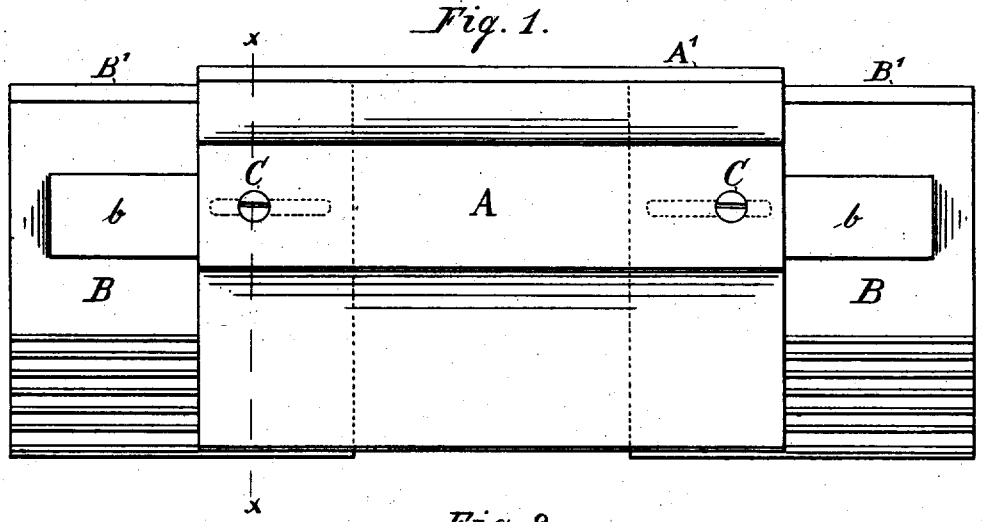
Figure 2:
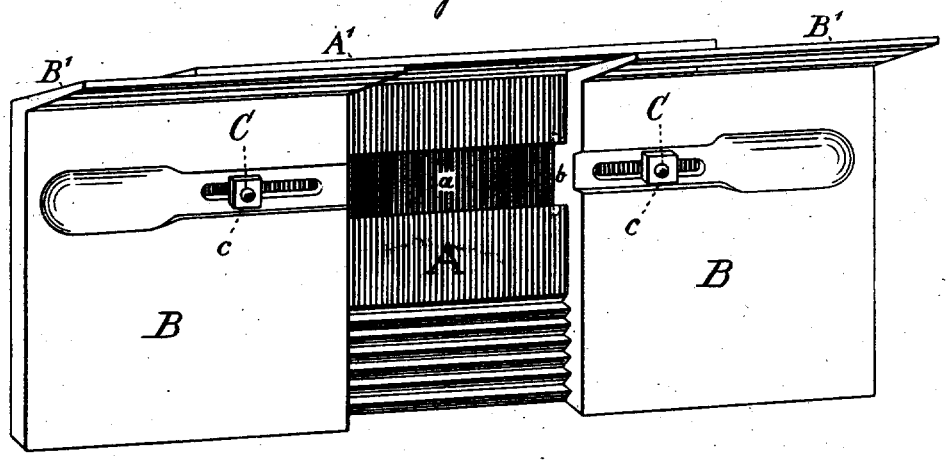
Figure 3:
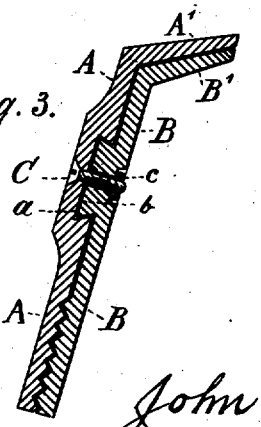

Figure 1 is a front elevation of my improved lining. Fig. 2 is a perspective view of the back side thereof. Fig. 3 is a transverse vertical section on the line *x x* in Fig. 1.

The object of my invention is to provide a simple and effective device which shall be adapted to replace the fire-backs of cook or other stoves when the same have been burned out.

In the drawings, the portions marked A represent the central or main piece of which my improved lining is composed; B, one or more end pieces, by which the length of the lining is extended; A′ and B′, flanges on said plates A and B, and C one or more bolts used in connecting the pieces A and B together.

In order to connect the several parts together effectually and make the device serviceable, they are constructed in a peculiar manner. The part A has formed in it a longitudinal groove, *a*, which is of a dovetail form. Each of the parts B has a corresponding rib, *b*, which fits into the groove *a*, and slides therein as the device is adjusted to fit the stove in which it is to be used.

The parts A and B are held together by bolts C, which pass through them. The holes in the part A for the reception of these bolts are preferably only large enough for that purpose. In the parts B, however, they are elongated to form slots, which permit said parts to slide back and forth on said bolts in adjusting the device. Surrounding these slots are depressions large enough to receive the nuts *c*, and which serve the double purpose of avoiding the projection which the ends of the bolts and the nuts would otherwise form on the back of the device, and of securing said nuts from turning. These depressions are preferably continued, in a slightly-different form, so far as the ribs *b* extend, so that the metal will be more nearly of an equal thickness than if the rib were added to the plate without forming such a depression to offset it.

In putting the parts of my device together they are slid endwise into each other, the ribs *b* entering the groove *a*. When said parts reach their proper positions, so that the device is of the required length to fit the space in the stove which it is to occupy, the bolts C are inserted and serve to connect them rigidly together.

I am aware that cast lugs and keys have been employed to connect together the several plates composing an adjustable fire-back; but such devices are liable to become broken and worthless. In this connection, therefore, I limit my claim to a series of plates extending across the fire-pot of a stove, forming a back, which are connected together and made adjustable by the use of ordinary bolts and slots, as shown.

The lower portions of the several plates composing my device may be corrugated, as shown, so that strips may be easily broken off if it should be too wide to fit the stove into which it is to be inserted.

The device, as a whole, is very simple and effective. It can be extended or diminished, as occasion requires, so as to fit various-sized stoves; and the plates being securely fastened together, it is in no danger of coming apart while in use.

Having thus fully described my said invention, what I claim as new, and desire to secure by Letters Patent, is—

1. The combination, in a stove-lining, of the plate A, having dovetailed groove *a*, and one or more plates, B, having dovetailed rib *b*, substantially as and for the purpose specified.

2. In the plates B of a stove-lining having ribs *b* projecting from one side thereof, corresponding depressions upon the opposite side, for the purpose of equalizing the metal, substantially as shown and specified.

3. The combination of the plate A, bolt C, and plate B, the latter having a suitably-formed depression to keep the nut on said bolt from turning, substantially as herein shown and specified.

4. The combination of the plate A, having a groove, the plate or plates B, having a corresponding rib, and the bolt C, connecting said plates together, substantially as herein shown and specified.

5. The combination of the plates A and B with the bolt C, said plate B having a slot through which said bolt passes, and by means of which said plate is enabled to slide longitudinally on said bolt and along said plate A, and also a depression surrounding said slot, the walls of which rise in close enough proximity to the nut on said bolt to prevent it from turning, substantially as herein shown and specified.

In witness whereof I have hereunto set my hand and seal at La Fayette, Indiana, this 8th day of March, A. D. 1879.

JOHN RIPLINGER. [L. S.]

In presence of—

WILLIAM H. BRYAN,
JOHN S. MCMILLIN.